US005413731A

United States Patent [19]

Adler et al.

[11] Patent Number: 5,413,731

[45] Date of Patent: May 9, 1995

[54] AMINOACRYLOYL-CONTAINING TERPOLYMERS

[75] Inventors: David E. Adler, Dresher; Thomas F. McCallum, III, Philadelphia; Jan E. Shulman, Newtown; Barry Weinstein, Dresher, all of Pa.

[73] Assignee: Rohm & Haas Company, Philadelphia, Pa.

[21] Appl. No.: 186,951

[22] Filed: Mar. 14, 1994

Related U.S. Application Data

[62] Division of Ser. No. 848,802, Mar. 10, 1992, Pat. No. 5,308,532.

[51] Int. Cl.[6] ...................... C11D 3/37; C08F 220/60; C08F 220/34

[52] U.S. Cl. .......................... 252/174.24; 252/174.23; 252/DIG. 19; 576/307.6; 576/307.3; 576/307; 576/292.95; 576/292.2; 576/240; 576/287; 576/312; 576/271; 576/274; 576/259; 576/263; 576/264; 576/265

[58] Field of Search .................. 526/307, 312, 292.95, 526/307.3, 307.6, 287, 240, 271, 274, 292.2; 252/174.23, 174.24, DIG. 19

[56] References Cited

U.S. PATENT DOCUMENTS

| | | | |
|---|---|---|---|
| 4,075,131 | 2/1978 | Sterling | 252/542 |
| 4,115,339 | 9/1978 | Restaino | 524/814 |
| 4,203,858 | 5/1980 | Chakrabarti | 252/135 |
| 4,534,892 | 8/1985 | Suzuki et al. | 252/545 |
| 4,608,188 | 8/1986 | Parker et al. | 252/99 |
| 4,784,789 | 11/1988 | Jeschke et al. | 252/174.23 |
| 5,126,069 | 6/1992 | Kud et al. | 252/174.23 |
| 5,176,797 | 1/1993 | Hartan et al. | 162/168.3 |

FOREIGN PATENT DOCUMENTS

| | | |
|---|---|---|
| 3627773 | 2/1988 | Germany . |
| 135293 | 8/1984 | Japan . |
| 4236208 | 8/1992 | Japan . |
| 2104091 | 3/1983 | United Kingdom . |
| 2203163 | 10/1988 | United Kingdom . |

OTHER PUBLICATIONS

A.S.T.M. Standard Test Method for Deposition on Glassware during Mechanical Dishwashing, Designation:D 3556-85, pp. 357-358, 1990, Publ. in Easton, Md.

*Primary Examiner*—Mark Nagumo
*Attorney, Agent, or Firm*—David T. Banchik

[57] ABSTRACT

This invention provides novel water-soluble terpolymers. These terpolymers contain as polymerized units (a) from about 92 to about 30 percent by weight of one or more $C_3$-$C_6$ monoethylenically unsaturated carboxylic acids;

(b) from about 5 to about 50 percent by weight of one or more aminoacryloyl derivatives; and (c) from about 3 to about 25 percent by weight of one or more monoethylenically unsaturated monomers polymerizable with (a) and (b). These terpolymers are useful in detergent formulations, particularly automatic machine dishwashing detergent formulations.

22 Claims, No Drawings

AMINOACRYLOYL-CONTAINING TERPOLYMERS

This is a divisional of application Ser. No. 848,802, filed Mar. 10, 1992, now U.S. Pat. No. 5,308,532.

FIELD OF THE INVENTION

This invention relates to terpolymers containing as polymerized units (a) one or more $C_3$–$C_6$ monoethylenically unsaturated carboxylic acids, (b) one or more aminoacryloyl derivatives, and (c) a third monomer polymerizable with (a) and (b). This invention further relates to the use of these terpolymers for cleaning formulations such as hard surface cleaner formulations and particularly automatic machine dishwashing detergent formulations. The terpolymers improve the spotting and filming characteristics of automatic machine dishwashing detergents.

BACKGROUND OF THE INVENTION

Polymeric additives are used in automatic machine dishwashing detergent formulations as phosphate substitutes, builders, thickeners, processing aids, film-control agents and spot-control agents. Unlike many other detergent formulations, it is critical that automatic machine dishwashing detergents are low foaming systems. Foam interferes with the mechanical washing action of the water which is sprayed in the machine. This requirement limits the types of polymeric additives and surfactants which can be used in an automatic machine dishwashing detergent formulation.

United Kingdom Patent No. 2,104,091 to Takashi et al. discloses amphoteric copolymers containing as polymerized units cationic vinyl monomers and anionic vinyl monomers for use in detergent compositions. The mole ratio of cationic vinyl monomer to anionic vinyl monomer is from 1:99 to 99:1 and is preferably 20:80 to 80:20. The molecular weight of the polymers is from 1,000 to 3,000,000. All of the examples employ copolymers having a 1:1 molar ratio of cationic vinyl monomer to anionic vinyl monomer. The polymers are disclosed to be useful for enhancing the foaming power of surfactant-based liquid detergent compositions.

U.S. Pat. No. 4,784,789 to Jeschke et al. discloses the use of certain copolymers for use in liquid hard-surface cleaner formulations to provide an anti-static finish on the surfaces. The polymers described therein are those taught by U.K. Patent No. 2,104,091, discussed above, which contain at least one mole of nitrogen-containing acrylic acid derivative per mole of acrylic acid.

U.S. Pat. No. 4,075,131 to Sterling discloses the use of zwitterionic copolymers for use in shampoos. The copolymers disclosed therein have a molar ratio of basic monomer to acidic monomer in the range of from 0.6:1 to 1.5:1.

U.S. Pat. No. 4,534,892 to Suzuki et. al discloses the use of crosslinked copolymers of acidic and basic monomers as dispersants for water-insoluble fine powders in liquid detergents. It further discloses that the copolymers effectively disperse the solids without interfering with the foaming properties of the detergent compositions.

Japanese Patent Application 59-135293A discloses terpolymers comprising at least 10 mole percent of each of (1) an anionic vinyl monomer, (b) a cationic vinyl monomer, and (c) a nonionic vinyl monomer, wherein the molar ratio of anionic vinyl monomer to cationic vinyl monomer is from 1:2 to 2:1. It further discloses that the polymers increase the detergency of detergent compositions, especially when used with surfactants.

Development of machine dishwashing detergents using substitutes for phosphate containing compounds has been addressed in the patent literature. U.S. Pat. No. 4,203,858 teaches using a low molecular weight polyacrylic acid in a phosphate free machine dishwashing composition. U.S. Pat. No. 4,608,188 teaches the use of a maleic acid/acrylic acid copolymer.

Other patents which include polymeric materials in dishwashing detergents are European Patent 132,792, German Patent DE 3627773-A, and UK Patent Application GB 2,203,163-A. EP 132,792 teaches certain cleaning compositions for washing dishes in automatic dishwashers. The compositions contain from 1 to 8 weight percent of a polycarboxylic acid having molecular weight of 12,000 to 40,000. In addition, the detergent contains surfactants and standard additives such as bleaching agents, biocides, perfumes, foaming-inhibitors, and/or solubilizers. The polymer can be poly(acrylic acid), poly(methacrylic acid), or polymers of maleic acid or fumaric acid and ethylene or propylene.

The object of the present invention is to provide novel water-soluble terpolymers and a method for their preparation. Another object of the present invention is to provide methods of enhancing the spotting and filming control of automatic machine dishwashing detergent formulations.

SUMMARY OF THE INVENTION

The water-soluble terpolymers of the present invention contain as polymerized units (a) from about 92 to about 30 percent by weight of one or more $C_3$–$C_6$ monoethylenically unsaturated carboxylic acids;

(b) from about 5 to about 50 percent by weight of one or more aminoacryloyl derivatives selected from the group consisting of

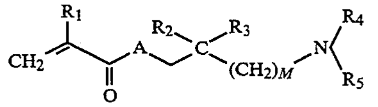

wherein:

$R_1$ is selected from the group consisting of hydrogen and methyl;

A is selected from the group consisting of O and NH;

$R_2$ and $R_3$ are either independently selected from the group consisting of hydrogen, methyl, ethyl, propyl, isopropyl, butyl, t-butyl, and isobutyl; or $R_2$ and $R_3$, together with the carbon to which they are both attached, form a $C_3$–$C_7$ aliphatic ring;

M is equal to 0, 1, or 2 with the proviso that when M is equal to 0, a C—N bond appears in place of the $(CH_2)_M$ group; and $R_4$ and $R_5$ are either independently selected from the group consisting of hydrogen, methyl, ethyl, propyl, isopropyl, butyl, t-butyl, and isobutyl; or $R_4$ and $R_5$, together with the nitrogen to which they are both attached, form a three to seven membered non-aromatic nitrogen heterocycle aliphatic ring; and ii)

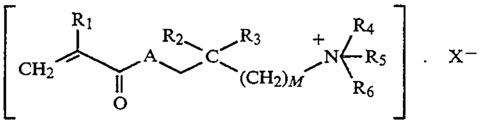

wherein:

$R_1$, A, $R_2$, $R_3$, $R_4$, $R_5$ and M are as defined above;

$R_6$ is selected from the group consisting of hydrogen, methyl, ethyl, propyl, isopropyl, butyl, t-butyl, and isobutyl;

and X is any suitable counterion such as a halogen, hydroxide, sulfate, hydrosulfate, phosphate, formate and acetate; and (c) from about 3 to about 25 percent by weight of one or more monoethylenically unsaturated monomers polymerizable with (a) and (b).

DETAILED DESCRIPTION OF THE INVENTION

The object of the present invention is to provide water-soluble terpolymers containing as polymerized units (a) from about 92 to about 30 percent by weight of one or more $C_3$–$C_6$ monoethylenically unsaturated carboxylic acids;

(b) from about 5 to about 50 percent by weight of one or more aminoacryloyl derivatives selected from the group consisting of i)

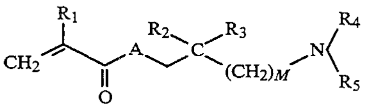

wherein:

$R_1$ is selected from the group consisting of hydrogen and methyl;

A is selected from the group consisting of O and NH;

$R_2$ and $R_3$ are either independently selected from the group consisting of hydrogen, methyl, ethyl, propyl, isopropyl, butyl, t-butyl, and isobutyl; or $R_2$ and $R_3$, together with the carbon to which they are both attached, form a $C_3$–$C_7$ aliphatic ring;

M is equal to 0, 1, or 2 with the proviso that when M is equal to 0, a C—N bond appears in place of the $(CH_2)_M$ group; and $R_4$ and $R_5$ are either independently selected from the group consisting of hydrogen, methyl, ethyl, propyl, isopropyl, butyl, t-butyl, and isobutyl; or $R_4$ and $R_5$, together with the nitrogen to which they are both attached, form a three to seven membered non-aromatic nitrogen heterocycle aliphatic ring; and ii)

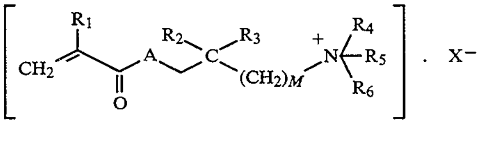

wherein:

$R_1$, A, $R_2$, $R_3$, $R_4$, $R_5$ and M are as defined above;

$R_6$ is selected from the group consisting of hydrogen, methyl, ethyl, propyl, isopropyl, butyl, t-butyl, and isobutyl;

and X is any suitable counterion such as a halogen, hydroxide, sulfate, hydrosulfate, phosphate, formate and acetate; and (c) from about 3 to about 25 percent by weight of one or more monoethylenically unsaturated monomers polymerizable with (a) and (b).

Component (a) is a $C_3$–$C_6$ monoethylenically unsaturated carboxylic acid. Suitable carboxylic acids include monoethylenically unsaturated monocarboxylic acids and monoethylenically unsaturated dicarboxylic acids. Examples of suitable monoethylenically unsaturated carboxylic acids include, but are not limited to, acrylic acid (AA), methacrylic acid (MAA), alpha-ethacrylic acid, $\beta,\beta$-dimethylacrylic acid, methylenemalonic acid, vinylacetic acid, allylacetic acid, ethylidineacetic acid, propylidineacetic acid, crotonic acid, maleic acid (MALAC), maleic anhydride (MALAN), fumaric acid, itaconic acid, citraconic acid, mesaconic acid, and alkali metal and ammonium salts thereof. Preferably, the monoethylenically unsaturated carboxylic acid is acrylic acid or methacrylic acid. The monoethylenically unsaturated carboxylic acid is incorporated into the terpolymer at a level of from about 92 to about 30 percent by weight of the resulting terpolymer. Preferably, the monoethylenically unsaturated carboxylic acid is incorporated at a level of from about 85 to about 40, and most preferably from about 80 to about 50 percent by weight of the terpolymer.

Component (b) is an aminoacryloyl derivative having the structural formula:

i)

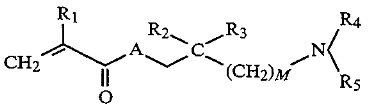

wherein:

$R_1$ is selected from the group consisting of hydrogen and methyl;

A is selected from the group consisting of O and NH;

$R_2$ and $R_3$ are either independently selected from the group consisting of hydrogen, methyl, ethyl, propyl, isopropyl, butyl, t-butyl, and isobutyl; or $R_2$ and $R_3$, together with the carbon to which they are both attached, form a $C_3$–$C_7$ aliphatic ring;

M is equal to 0, 1, or 2 with the proviso that when M is equal to 0, a C—N bond appears in place of the $(CH_2)_M$ group; and $R_4$ and $R_5$ are either independently selected from the group consisting of hydrogen, methyl, ethyl, propyl, isopropyl, butyl, t-butyl, and isobutyl; or $R_4$ and $R_5$, together with the nitrogen to which they are both attached, form a three to seven membered non-aromatic nitrogen heterocycle aliphatic ring; or ii)

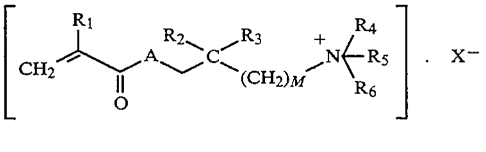

wherein:

$R_1$, A, $R_2$, $R_3$, $R_4$, $R_5$ and M are as defined above;

$R_6$ is selected from the group consisting of hydrogen, methyl, ethyl, propyl, isopropyl, butyl, t-butyl, and isobutyl;

and X is any suitable counterion such as a halogen, hydroxide, sulfate, hydrosulfate, phosphate, formate and acetate. Examples of component (b) include but are not limited to N,N-dimethylaminoethyl acrylate (DMAEA), N,N-dimethylaminoethyl methacrylate (DMAEMA), N-[3-(dimethylamino)propyl] acrylamide (DMAPA), N-[3-(dimethylamino)propyl] methacrylamide (DMAPMA), tert-butylaminoethyl methacrylate (t-BAEMA), (3-acrylamidopropyl)trimethylammonium chloride (APTAC), (3-methacrylamidopropyl)trimethylammonium chloride (MAPTAC), and N-[3-(dimethylamino)-2,2-dimethylpropyl]acrylamide (DMADMPA). The aminoacryloyl derivative is incorporated into the terpolymer at a level of from about 5 to about 50 percent by weight of the resulting terpolymer. Preferably, the aminoacryloyl derivative is incorporated at a level of from about 5 to about 40, and most preferably from about 10 to about 30 percent by weight of the terpolymer.

Component (c) of the terpolymer is a monoethylenically unsaturated monomer which is polymerizable with components (a) and (b) and is at least partially soluble in water or the reaction solvent, or in the other monomers if no water or solvent is used. Suitable monomers include any of the $C_3$–$C_6$ monoethylenically unsaturated carboxylic acids and their alkali metal and ammonium salts used for component (a); $C_1$–$C_4$ alkyl esters of acrylic acid and methacrylic acid such as methyl acrylate, ethyl acrylate (EA), butyl acrylate (BA), methyl methacrylate (MMA), and butyl methacrylate (BMA); $C_1$–$C_4$ hydroxyalkyl esters of acrylic acid and methacrylic acid such as hydroxyethyl acrylate (HEA), hydroxypropyl acrylate (HPA), and hydroxyethyl methacrylate (HEMA); acrylamide (AM); alkyl substituted acrylamides, such as methacrylamide (MAM), N-t-butylacrylamide (t-BAM) and N-t-octylacrylamide; N,N-dialkyl substituted acrylamides, such as N,N-dimethyl acrylamide and piperidineacrylamide; styrene; sulfonated styrene; sulfonated alkyl acrylamides, such as 2-acrylamidomethylpropanesulfonic acid (AMPSA); vinylsulfonates; vinylsulfonic acid; alylsulfonic acid; methallylsulfonic acid; vinylphosphonic acid; vinylacetate; allyl alcohols; sulfonated allyl alcohols; acrylonitrile; N-vinylpyrrolidone; N-vinylformamide; N-vinylimidazole; N-vinylpyridine; N-vinyl-2-methylimidazoline. Preferably, the monomer is acrylamide, $C_3$–$C_6$ monoethylenically unsaturated carboxylic acids or alkali metal or ammonium salts thereof, $C_1$–$C_4$ alkyl esters of acrylic acid or methacrylic acid, or $C_1$–$C_4$ hydroxyalkyl esters of acrylic acid. The monomer (c) is incorporated into the terpolymer at a level of from about 3 to about 25 percent by weight of the resulting terpolymer. Preferably, the monomer is incorporated at a level of from about 3 to about 20, and most preferably from about 5 to about 20 percent by weight of the terpolymer.

The relative amounts of components (a) and (b) are in the molar ratio of from 2:1 to 100:1. Preferably, the molar ratio of component (a) to component (b) is from about 2.5:1 to about 90:1 and most preferably from about 3:1 to about 50:1.

The initiators suitable for making the terpolymers of the present invention are any of the conventional water-soluble free-radical initiators and redox initiators. Suitable free-radical initiators include, but are not limited to, peroxides, persulfates, peresters, and azo initiators. Suitable redox initiators include, but are not limited to, peroxides, such as hydrogen peroxide, and persulfates, such sodium persulfate. Also, mixed initiator systems can be used such as a combination of a free radical initiator and a redox initiator. The level of initiator is generally from 0.1 to about 20 percent by weight based on the total amount of polymerizable monomers. Preferably, the initiator is present at a level of from about 1 to about 15 percent and most preferably at a level of from about 2 to about 10 percent by weight based on the total amount of polymerizable monomer.

In addition to the initiator, one or more promoters may also be used. Suitable promoters include water-soluble salts of metal ions. Suitable metal ions include iron, copper, cobalt, manganese, vanadium and nickel. Preferably, the one or more promoters are water-soluble salts of iron or copper. When used, the one or more promoters are present at levels of from about 1 to about 100 ppm based on the total amount of polymerizable monomer. Preferably, the one or more promoters are present at levels of from about 3 to about 20 ppm based on the total polymerizable monomers.

It is generally desirable to control the pH of the polymerizing monomer mixture especially when using thermal initiators such as persulfate salts. The pH of the polymerizing monomer mixture can be controlled by a buffer system or by the addition of a suitable acid or base and is preferably designed to maintain the pH of the system from between about 3 and about 8, and most preferably from between about 4 and about 6.5. Similarly, when redox couples are used there will be an optimum pH range in which to conduct the polymerization depending on the choice of the components of the redox couple. The pH of the system can be adjusted to suit the choice of the redox couple by the addition of an effective amount of a suitable acid or base.

When the polymerization is conducted as a solution polymerization employing a solvent other than water, the reaction should be conducted up to about 70 percent by weight, preferably from about 40 to about 60 percent by weight of polymerizable monomers based on the total reaction mixture. Similarly, when the polymerization is conducted as an aqueous polymerization, the reaction should be conducted up to about 70 percent by weight, preferably from about 40 to about 60 percent by weight of polymerizable monomers based on the total reaction mixture. In general, it is preferred to conduct the polymerizations as aqueous polymerizations. The solvents or water, if used, can be introduced into the reaction vessel as a heel charge, or can be fed into the reactor either as a separate feed stream or as a diluent for one of the other components being fed into the reactor.

The temperature of the polymerization reaction will depend on the choice of initiator, solvent and target molecular weight. Generally, the temperature of the polymerization is up to the boiling point of the system although the polymerization can be conducted under pressure if higher temperatures are used. Preferably, the temperature of the polymerization is from about 50° to about 95° C. and most preferably from about 60° to about 80° C.

The terpolymers of the present invention are water-soluble. This limits the maximum molecular weight of the terpolymers. Furthermore, the limit of the molecular weight will vary depending upon the relative amounts, and the hydrophilicity, of the monomer components incorporated into the terpolymer. If desired, chain regulators or chain transfer agents may be employed to assist in controlling the molecular weight of the polymers. Any conventional water-soluble chain regulator or chain transfer agent can be used. Suitable chain regulators include, but are not limited to, mercaptans, hypophosphites, isoascorbic acid, alcohols, aldehydes, hydrosulfites and bisulfites. If a chain regulator or chain transfer agent is used, preferred mercaptans are 2-mercaptoethanol and 3-mercaptopropionic acid; a preferred bisulfite is sodium metabisulfite. Generally, the weight average molecular weight ($M_w$) of the terpolymers is from about 500 to about 100,000, preferably from about 750 to about 30,000 and most preferably from about 1,000 to about 25,000 as measured by aqueous gel permeation chromatography relative to a poly(acrylic acid) standard.

The methods of polymerization are well known to those skilled in the art. The terpolymers of the present invention can be prepared by aqueous polymerization, solvent polymerization or bulk polymerization. Preferably, the terpolymers are prepared by aqueous polymerization. Furthermore, the polymerization can be conducted as a batch, cofeed, heel, semi-continuous or continuous process. Preferably, the polymerization is conducted as a cofeed or continuous process.

When the process of the present invention is run as a cofeed process, the initiator and monomers are generally introduced into the reaction mixture as separate streams which are fed linearly (i.e. at constant rates). If desired, the streams can be staggered so that one or more of the streams are completed before the others. If desired, a portion of the monomers or initiators may be added to the reactor before the feeds are begun. The monomers can be fed into the reaction mixture as individual streams or combined into one or more streams. Preferably, the monomer stream containing component (b) is not combined with the monomer stream containing component (a).

The concentration of terpolymer in a detergent composition is from about 0.2 to 10 percent by weight of the detergent composition and more preferably from about 0.5 to 7 percent by weight. The concentration of the terpolymer in the detergent composition is dependent on the amount of other additives in the detergent composition which have an impact on the desired performance characteristics. For example, if a phosphate containing compound is present in the detergent composition, the effective amount of terpolymer necessary to achieve the desired performance may be lower than if no phosphate containing compound is present.

The detergent composition of this invention can be in the form of either a powder or liquid. As used herein, "liquid" also refers to a gel or a slurry. The detergent composition of this invention may include conventional machine dishwashing detergent additives well known to those skilled in the art, in conventional use amounts. For example, the detergent composition of this invention may contain an alkali metal Silicate at a concentration of from 0 to about 50 percent, more preferably from about 1 to 20 percent by weight of the detergent composition. The alkali metal silicates used in the composition of the current invention generally have an $SiO_2$:$M_2O$ ratio (where $M_2O$ represents the alkali metal oxide portion of the silicate) of from about 1:1 to about 3.5:1. The more preferred alkali metal silicates are the sodium silicates.

While the alkali metal silicates are an optional component of the present invention, highly alkaline dishwashing detergents containing no silicates may attack aluminum pots and pans and other metal utensils. Therefore, silicates are beneficial when corrosion inhibition of metal parts is desired.

The detergent composition of this invention may optionally include a builder. The level of builder can be from 0 to about 90 percent and more preferably from 20 to 90 percent by weight of the detergent composition. However, the builder concentration is dependent on whether the detergent is a liquid or a powder. Generally, a liquid composition will contain less builder than a powder composition. By way of example, builders which may be employed in combination with the terpolymers of the present invention include water soluble inorganic builder salts such as alkali metal polyphosphates, i.e., the tripolyphosphates and pyrophosphates, alkali metal carbonates, borates, bicarbonates, and hydroxides and water soluble organic builders such as polycarboxylates including nitrilotriacetic acid, citrates, tartarates and succinates. Also, zeolite may be added as a builder in amounts from 0 to about 40 percent, and more preferably from about 5 to 20 percent by weight.

Polymeric additives can also be used in the detergent formulations. Conventional polymeric additives include, but are not limited to water-soluble homopolymers of acrylic acid, and copolymers of acrylic acid with a suitable comonomer such as maleic anhydride, and the salts of these polymers. When used, the polymeric additives are present in the detergent formulation at levels of from about 0.2 percent to about 15 percent by weight and preferably at a level of from about 0.2 to about 10 percent and most preferably from about 0.5 percent to about 8 percent by weight of the detergent formulation.

Inert diluents, such as alkali metal chlorides, sulfates, nitrates, nitrites and the like, may also be used in the detergent composition. Examples of such diluents are sodium or potassium chloride, sodium or potassium sulfate, sodium or potassium nitrite, and the like. In addition, if the detergent composition is in the liquid form, water can be used as a diluent. The amount of diluent used is generally an amount to bring the total amount of the additives in the detergent composition up to 100% by weight.

Although optional, the detergent compositions of this invention will generally contain a low-foaming water soluble surfactant. Low-foaming surfactants are preferred for the detergent compositions of the present invention since foam reduces the mechanical efficiency of the wash spray as discussed previously. Certain low-foaming water soluble anionic, nonionic, zwitterionic, amphoteric surfactant or combinations thereof should be employed. The quantity of surfactant used in the detergent formulation will depend on the surfactant chosen and will generally be from about 0.1 to about 10 percent and more preferably from about 1 to about 5 percent by weight of the detergent composition.

Examples of suitable anionic surfactants include soaps such as the salts of fatty acids containing about 9 to 20 carbon atoms, e.g. salts of fatty acids derived from coconut oil and tallow; alkylbenzenesulfonates—particularly linear alkylbenzenesulfonates in which the alkyl group contains from 10 to 16 carbon atoms; alcohol sulfates; ethoxylated alcohol sulfates; hydroxyalkylsulfonates; alkenyl and alkyl sulfates and sulfonates; monoglyceride sulfates; acid condensates of fatty acid chlorides with hydroxyalkylsulfonates and the like. Because anionic surfactants tend to produce foam, it is preferred that the level of anionic surfactant is kept to a minimum and may require the use of a foam suppressant. If used, the level of anionic surfactant is preferably below 5 percent, and most preferably below 3 percent by weight of the formulation.

Examples of suitable nonionic surfactants include alkylene oxide (e.g. ethylene oxide) condensates of mono and polyhydroxy alcohols, alkylphenols, fatty acid amides, and fatty amines; amine oxides; sugar derivatives such as sucrose monopalmitate; long chain tertiary phosphine oxides; dialkylsulfoxides; block copolymers of poly(ethylene oxide) and poly(propylene oxide); hydrophobically modified poly(ethylene oxide) surfactants; fatty acid amides, (e.g., mono or diethanolamides of fatty acids containing 10 to 18 carbon atoms), and the like. The hydrophobically modified poly(ethylene oxide) surfactants are the preferred nonionic surfactants.

Examples of suitable zwitterionic surfactants include derivatives of aliphatic quaternary ammonium compounds such as 3-(N,N-dimethyl-N-hexadecylammonio)propane-1-sulfonate and 3-(N,N-dimethyl-N-hexadecylammonio)-2-hydroxypropane- 1-sulfonate.

Examples of suitable amphoteric surfactants include betaines, sulfobetaines and fatty acid imidazole carboxylates and sulfonates.

The detergent may also contain up to about 20 percent by weight of a bleaching agent, and preferably from about 0.5 to about 15 percent by weight. Suitable bleaching agents include the halogen, peroxide and peracid bleaches. Examples of suitable bleaches include sodium chlorite, potassium chlorite, sodium hypochlorite, potassium hypochlorite, sodium dichloroisocyanurate, sodium perborate, potassium perborate and sodium percarbonate.

The detergent may also contain up to about 5 percent by weight of conventional adjuvants such as perfumes, colorants, foam suppressants, enzymes and bacterial agents. When the detergent composition is in the liquid form, from 0 to 5 percent by weight of stabilizers or viscosity modifiers, such as clays and polymeric thickeners, can be added.

The detergent composition of this invention is used in machine dishwashers as an aqueous solution at a concentration of about 0.2 to 1.5 percent, more preferably from about 0.4 to 1 percent by weight of the detergent. The water temperature during the washing process should be about 100° F. to 150° F. and more preferably from about 110° F. to 135° F.

Test Method

The dishwashing tests were performed using a modified version of A.S.T.M. method D 3556-85, *Standard Test Method for Deposition on Glassware During Mechanical Dishwashing*. This test method covers a procedure for measuring performance of household automatic dishwashing detergents in terms of the buildup of spots and film on glassware. Glass tumblers were given three cycles in a dishwasher, in the presence of food soils, and the levels of spotting and filming allowed by the detergents under test were compared visually.

A Kenmore dishwashing machine was used to perform the washing tests. The bottom rack of the dishwasher was randomly loaded with 14–18 dinner plates and the top rack was randomly loaded with several beakers and cups. Four new 10 ounce tumblers were placed randomly on the top racks as the test glasses. Soil used in the test was a mixture of 80% Parkay Margarine and 20% Carnation Non-fat Dry milk. The amount of soil used for each test was usually 40 grams for the first wash.

When a test was ready to be started, the desired amount of soil was smeared across the plates on the bottom rack, the detergent for the first cycle was placed in the detergent dispenser cup, and the machine was started. A normal cycle consisted of a wash, a rinse, a second wash, and two more rinses followed by a heat-drying cycle. At the beginning of the second wash, the machine was opened and a second detergent aliquot added. Soil was not added when a second detergent dose was added. The temperature of the supply water was maintained at 120° F. unless noted otherwise. Tap water with a measured hardness of 200 ppm and a Ca++ to Mg++ ratio of 2.0:1 was used as supply water unless noted otherwise. The machine was then allowed to complete the normal cycle including the drying time. This procedure was followed for a total of three complete cycles for each set of glasses.

When the final drying cycle was completed, the door was opened and the four glasses were removed and evaluated for filming and spotting. The test glasses were evaluated by placing them in light box equipped with a fluorescent light. The glasses were ranked according to the following scale and the average rating for the four glasses is reported below in Table 1:

| Filming | Spotting |
|---|---|
| 0 No film | 0 No spots |
| 1 Barely perceptible | 1 Random |
| 2 Slight | 2 ¼ of glass |
| 3 Moderate | 3 ½ of glass |
| 4 Heavy | 4 Complete spotting |

Detergent Composition Tested (by weight solids)

| | |
|---|---|
| 20% | sodium carbonate |
| 12.5% | sodium citrate.$2H_2O$ |
| 7.5% | zeolite |
| 5% | perborate.$4H_2O$ |
| 7% | RU Silicate ($SiO_2$:$Na_2O$ equal to 2.4:1) |
| 4% | Olin Polytergent ® SLF-18 surfactant |
| 4% | polymer (unless specifically stated otherwise) diluted to 100% with sodium sulfate. |

The terpolymer synthesis which follows is representative of the cofeed process suitable for preparing terpolymers of the present invention. Methods of preparing the terpolymers of the present invention are not limited to this procedure.

TERPOLYMER SYNTHESIS 75AA/20DMAPA/5BA 250.0 grams of deionized water and 12.0 grams of 0.15 percent $FeSO_4.7H_2O$ in deionized water were added to a 3-liter round bottom flask equipped with a stirrer, thermometer, condenser, heater, and inlets for monomer, and initiator solutions. The stirrer was turned on and the water was heated to 70° C. A solution of 1.8 grams sodium metabisulfite dissolved in 10.0 grams of deionized water was added to the flask. Four feed solutions were prepared: a monomer solution of 450.0 grams glacial acrylic acid and 30.0 grams butyl acrylate; a monomer solution of 120.0 grams of DMAPA; an initiator solution of 3.32 grams of sodium persulfate dissolved in 20.0 grams of deionized water; and a chain regulator solution of 30.0 grams sodium metabisulfite dissolved in 75 grams of deionized water. These solutions were fed into the flask linearly and separately over two hours (except the chain regulator solution which was fed for 105 minutes) while maintaining the mixture at 70° C. After the feeds were completed, the mixture was maintained at 70° C. for ten minutes. The data for this terpolymer appears as Example 5 in Table 1 below.

The terpolymers appearing in Table 1, below, were prepared in a similar manner as the terpolymer synthesis above with the monomer compositions as noted. Compositions are listed as percent by weight of the monomer mix.

TABLE 1

| Example | Composition | $M_w$ | Spot | Film |
|---|---|---|---|---|
| Comparative 1 | Acusol ® 445N[1] | 4500 | 3.5 | 1.0 |
| Comparative 2 | Acusol ® 445N | 4500 | 2.0 | 0.4 |
| Comparative 3 | Acusol ® 445N[5] | 4500 | 2.7 | 0.8 |
| 1 88 AA/ | 5 DIMAPA /7 BA | 4220 | 3.0 | 0.6 |
| 2 83 AA/ | 10 DIMAPA /7 BA | 4010 | 2.5 | 0.7 |
| 3 78 AA/ | 15 DIMAPA /7 BA | 4510 | 0.0 | 0.2 |
| 4 75 AA/ | 20 DIMAPA /5 BA | 4450 | 0.1 | 0.1 |
| 5 75 AA/ | 20 DIMAPA /5 BA[5] | 4800 | 0.2 | 0.3 |
| 6 80 AA/ | 15 DIMAPA /5 BA | 4080 | 1.0 | 0.0 |
| 7 80 AA/ | 15 DIMAPA /5 STY | 6510 | 1.5 | 0.0 |
| 8 83 AA/ | 10 DIMAPMA /7 BA | 4180 | 2.5 | 0.6 |
| 9 80 AA/ | 15 DIMAPMA /5 BA | 4180 | 3.5 | 0.0 |
| 10 80 AA/ | 15 DIMAPMA /5 STY | 6560 | 0.5 | 0.2 |
| 11 75 AA/ | 15 DIMAPMA /10 MMA | 4780 | 0.9 | 0.0 |
| 12 70 AA/ | 15 DIMAPMA /15 MMA | 4790 | 3.2 | 0.0 |
| 13 75 AA/ | 20 DIMAPMA /5 STY | 6010 | 0.5 | 0.0 |
| 14 75 AA/ | 20 DIMAPMA /5 BA | 6490 | 0.8 | 0.0 |
| 15 80 AA/ | 15 DMAEMA /5 BA | 5120 | 1.5 | 0.0 |
| 16 75 AA/ | 20 DMAEMA /5 tBAM | 5330 | 3.0 | 0.0 |
| 17 75 AA/ | 20 DMAEMA /5 STY | 5480 | 3.0 | 0.0 |
| 18 75 AA/ | 20 DMAEMA /5 BA | 4420 | 1.5 | 0.0 |
| 19 75 AA/ | 20 DMAEMA /5 EA | 4260 | 2.5 | 0.0 |
| 20 80 AA/ | 15 t-BAEMA /5 BA | 4020 | 3.2 | 0.0 |
| 21 74 AA/ | 21 DMAPMA /5 BA | 5210 | 0 | 0.3[2] |
| 22 75 AA/ | 20 APTAC /5 BA[5] | 3970 | 1.0 | 0.2 |
| 23 55 AA/ | 40 APTAC /5 BA[3] | 4660 | 0 | 3.2[2] |
| 24 75 AA/ | 20 DMAEA /5 BA | 5120 | 0 | 0.6[2] |
| 25 55 AA/20 MALAC/ | 20 APTAC /5 AMPSA[4] | 6270 | 0 | 0.2[2] |
| 26 3% Example 4/1% Acusol ® 445N | | | 0 | 0.2 |
| 27 2% Example 4/2% Acusol ® 445N | | | 0 | 0.3 |
| 28 2% Example 5/2% Acusol ® 445N[5] | | | 0.3 | 0.3 |
| 29 1% Example 4/3% Acusol ® 445N | | | 0 | 0.1 |

[1] Example 1 was tested in a detergent composition containing only 2% by weight surfactant. Acusol ® 445N is a fully neutralized poly(acrylic acid) having $M_w$ 4,500. Acusol is a registered trademark of Rohm and Haas Company.

[2] These compositions were tested at a cycle temperature of 135° F. and hardness of 300 ppm wherein the ratio of $Ca^{2+}:Mg^{2+}$ was 3.5:1.

[3] Dilute sulfuric acid solution was added during polymerization to maintain pH between 1.0 and 3.5.

[4] Prepared by a thermal process using mixed initiator system of 4.8 weight percent sodium persulfate based on active monomer and 4.0 percent hydrogen peroxide based on active monomer. Dilute NaOH was added during the polymerization to maintain in-process pH between 3.5 and 7.0.

[5] These compositions were tested at a hardness of 300 ppm wherein the ratio of $Ca^{2+}:Mg^{2+}$ was 3.5:1.

The data in Table 1 shows the effectiveness of the polymers of the present invention for enhancing the spotting and filming properties of automatic machine dishwashing detergents containing them.

We claim:

1. A water-soluble terpolymer, consisting essentially of polymerized units of (a) from about 92 to about 30 percent by weight of one or more monomers selected from the group consisting of $C_3$–$C_6$ monoethylenically unsaturated carboxylic acids and alkali metal and ammonium salts thereof;

(b) from about 5 to about 50 percent by weight of one or more aminoacryloyl derivatives selected from the group consisting of i)

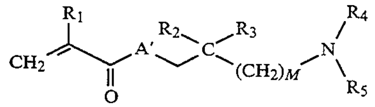

wherein:

$R_1$ is selected from the group consisting of hydrogen and methyl;

A' is oxygen;

$R_2$ and $R_3$ are either independently selected from the group consisting of hydrogen, methyl, ethyl, propyl, isopropyl, butyl, t-butyl, and isobutyl; or $R_2$ and $R_3$, together with the carbon to which they are both attached, form a $C_3$–$C_7$ aliphatic ring;

M is equal to 0, 1, or 2 with the proviso that when M is equal to 0,a C—N bond appears in place of the $(CH_2)_M$ group; and $R_4$ and $R_5$ are either independently selected from the group consisting of hydrogen, methyl, ethyl, propyl, isopropyl, butyl, t-butyl, and isobutyl; or $R_4$ and $R_5$, together with the nitrogen to which they are both attached, form a three to seven membered non-aromatic nitrogen heterocycle;

and ii)

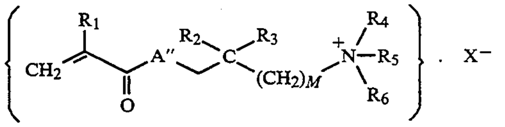

wherein:

$R_1$, $R_2$, $R_3$, $R_4$, $R_5$ and M are as defined above;

A″ is oxygen;

$R_6$ is selected from the group consisting of hydrogen, methyl, ethyl, propyl, isopropyl, butyl, t-butyl, and isobutyl;

and X is a counterion selected from the group consisting of halogens, hydroxide, sulfate, hydrosulfate, phosphate, formate and acetate; and (c) from about 3 to about 25 percent by weight of one or more monoethylenically unsaturated monomers polymerizable with (a) and (b) selected from the group consisting of $C_1$–$C_4$ alkyl esters of acrylic acid, $C_1$–$C_4$ alkyl esters of methacrylic acid, $C_1$–$C_4$ hydroxyalkyl esters of acrylic acid, $C_1$–$C_4$ hydroxyalkyl esters of methacrylic acid, acrylamide, alkyl substituted acrylamides, N,N-dialkyl substituted acrylamides, styrene, sulfonated styrene, sulfonated alkyl acrylamides, vinylsulfonates, vinylsulfonic acid, allylsulfonic acid, methallylsulfonic acid, vinylphosphonic acid, vinylacetate, allyl alcohols, sulfonated allyl alcohols, acrylonitrile, N-vinylpyrrolidone, N-vinylformamide, N-vinylimidazole, N-vinylpyridine, and N-vinyl-2-methylimidazoline;

wherein the molar ratio of (a) to (b) is from 2.5:1 to 90:1; and wherein the $M_w$ of the terpolymer is from about 750 to about 30,000.

2. The terpolymer of claim 1 wherein (b) is selected from the group consisting of: N,N-dimethylaminoethyl acrylate, N,N-dimethylaminoethyl methacrylate and tert-butylaminoethyl methacrylate.

3. The terpolymer of claim 1 wherein (b) is selected from the group consisting of: N,N-dimethylaminoethyl acrylate and N,N-dimethylaminoethyl methacrylate.

4. The terpolymer of claim 1 wherein (b) is tert-butylaminoethyl methacrylate.

5. The terpolymer of claim 1 wherein (b) is present at a level of from about 5 to about 40 percent by weight.

6. The terpolymer of claim 1 wherein (b) is present at a level of from about 10 to about 30 percent by weight.

7. The terpolymer of claim 1 wherein (a) is selected from the group consisting of: acrylic acid, methacrylic acid, alpha-ethacrylic acid, beta, beta-dimethylacrylic acid, methylenemalonic acid, vinylacetic acid, allylacetic acid, ethylideneacetic acid, propylideneacetic acid, crotonic acid, maleic acid, maleic anhydride, fumaric acid, itaconic acid, citraconic acid, mesaconic acid, and alkali metal and ammonium salts thereof.

8. The terpolymer of claim 1 wherein (a) is selected from the group consisting of acrylic acid, methacrylic acid and alkali metal and ammonium salts thereof.

9. The terpolymer of claim 1 wherein (a) is present at a level of from about 85 to about 40 percent by weight.

10. The terpolymer of claim 1 wherein (a) is present at a level of from about 80 to about 50 percent by weight.

11. The terpolymer of claim 1 wherein (c) is selected from the group consisting of methyl acrylate, ethyl acrylate, butyl acrylate, methyl methacrylate, and butyl methacrylate, hydroxyethyl acrylate, hydroxypropyl acrylate, hydroxyethyl methacrylate, acrylamide, t-butyl acrylamide, N-t-octylacrylamide dimethyl acrylamide, piperdine acrylamide, styrene, sulfonated styrene, vinylsulfonic acid, allylsulfonic acid, methallylsulfonic acid, vinylphosphonic acid, vinylacetate, acrylonitrile, N-vinylpyrrolidone, N-vinylformamide, N-vinylimidazole, N-vinylpyridine, and N-vinyl-2-methylimidazoline and 2-acrylamido methylpropane sulfonic acid.

12. The terpolymer of claim 1 wherein (c) is selected from the group consisting of methyl methacrylate, butyl methacrylate, butyl acrylate ethyl acrylate, t-butyl acrylamide, styrene and 2-acrylamido methylpropane sulfonic acid.

13. The terpolymer of claim 1 wherein (c) is present at a level of from about 3 to about 20 percent by weight.

14. The terpolymer of claim 1 wherein (c) is present at a level of from about 5 to about 20 percent by weight.

15. The terpolymer of claim 1 wherein the weight average molecular weight of the terpolymer is from about 1,000 to about 25.000.

16. A cleaning composition comprising the terpolymer of claim 1 in an amount effective to reduce spotting and filming.

17. An automatic machine dishwashing detergent composition comprising the terpolymer of claim 1.

18. The automatic machine dishwashing detergent composition of claim 17 wherein the terpolymer is present at a level of from 0.2 to about 10 percent by weight.

19. The automatic machine dishwashing detergent composition of claim 17 wherein the terpolymer is present at a level of from about 0.5 to about 7 percent by weight.

20. A method of making terpolymers comprising: contacting a mixture of (a) from about 92 to about 30 percent by weight of one or more monomers selected from the group consisting of $C_3$–$C_6$ monoethylenically unsaturated carboxylic acids and alkali metal and ammonium salts thereof;

(b) from about 5 to about 50 percent by weight of one or more aminoacryloyl derivatives selected from the group consisting of i)

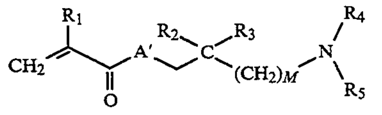

wherein:

$R_1$ is selected from the group consisting of hydrogen and methyl;

A′ is oxygen;

$R_2$ and $R_3$ are either independently selected from the group consisting of hydrogen, methyl, ethyl, propyl, isopropyl, butyl, t-butyl, and isobutyl; or $R_2$ and $R_3$, together with the carbon to which they are both attached, form a $C_3$–$C_7$ aliphatic ring;

M is equal to 0, 1, or 2 with the proviso that when M is equal to 0, a C—N bond appears in place of the $(CH_2)_M$ group; and $R_4$ and $R_5$ are either independently selected from the group consisting of hydrogen, methyl, ethyl, propyl, isopropyl, butyl, t-butyl, and isobutyl; or $R_4$ and $R_5$, together with the nitrogen to which they are both attached, form a three to seven membered non-aromatic nitrogen heterocycle;

and ii)

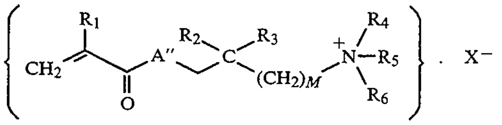

wherein:

$R_1$, $R_2$, $R_3$, $R_4$, $R_5$ and M are as defined above;

A" is oxygen;

$R_6$ is selected from the group consisting of hydrogen, methyl, ethyl, propyl, isopropyl, butyl, t-butyl, and isobutyl;

and X is a counterion selected from the group consisting of halogens, hydroxide, sulfate, hydrosulfate, phosphate, formate and acetate; and (c) from about 3 to about 25 percent by weight of one or more monoethylenically unsaturated monomers polymerizable with (a) and (b) selected from the group consisting of $C_1$–$C_4$ alkyl esters of acrylic acid, $C_1$–$C_4$ alkyl esters of methacrylic acid, $C_1$–$C_4$ hydroxyalkyl esters of acrylic acid, $C_1$–$C_4$ hydroxyalkyl esters of methacrylic acid, acrylamide, alkyl substituted acrylamides, N,N-dialkyl substituted acrylamides, styrene, sulfonated styrene, sulfonated alkyl acrylamides, vinylsulfonates, vinylsulfonic acid, allylsulfonic acid, methallylsulfonic acid, vinylphosphonic acid, vinylacetate, allyl alcohols, sulfonated allyl alcohols, acrylonitrile, N-vinylpyrrolidone, N-vinylformamide, N-vinylimidazole, N-vinylpyridine, and N-vinyl-2-methylimidazoline;

wherein the molar ratio of (a) to (b) is from 2.5:1 to 90:1; with an initiator in amount effective to polymerize said mixture, and maintaining the mixture at an elevated temperature to produce a terpolymer produce; and wherein the $M_w$ of the terpolymer is from above 750 to about 30,000.

21. The method of claim 20 further comprising one or more solvents.

22. The method of claim 20 wherein the solvent is water.

* * * * *